June 19, 1962  M. BYER ET AL  3,040,213
COMPOSITE GLACERAMIC ARTICLES AND METHOD OF MAKING
Filed Nov. 15, 1956  2 Sheets-Sheet 1
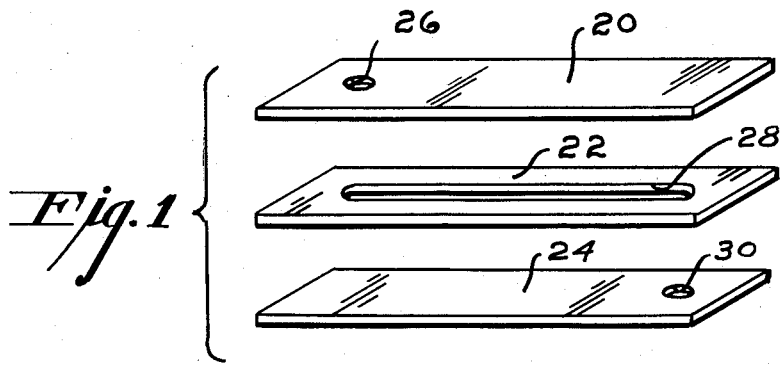
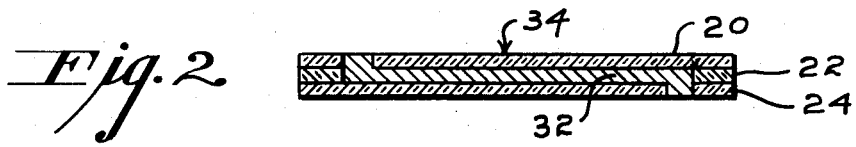
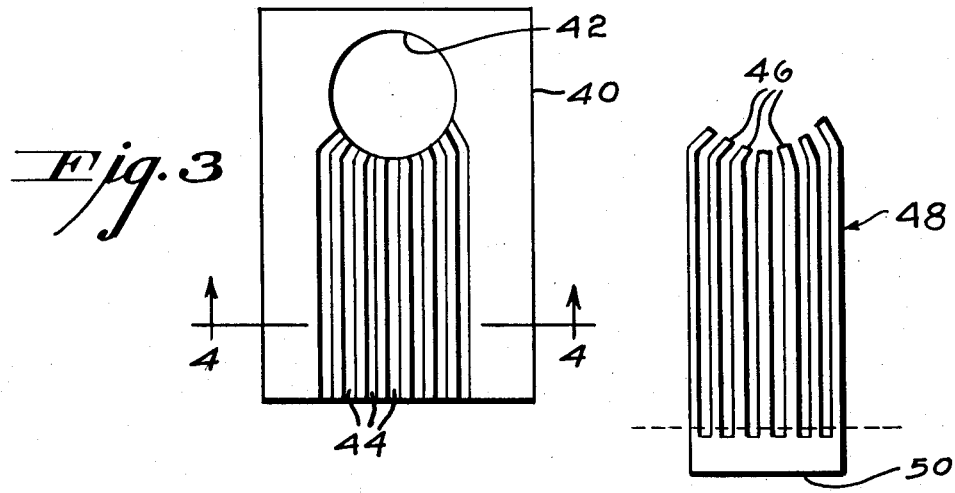
INVENTORS
MARSHALL BYER,
THOMAS G. O'LEARY
AND THEODORE L. REED
BY Clarence R. Patty, Jr.
ATTORNEY

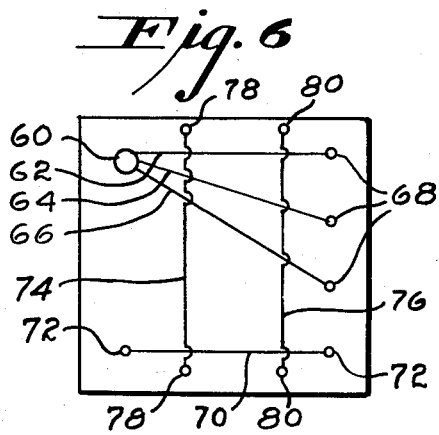
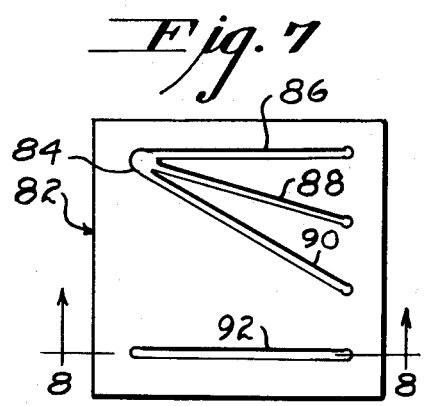
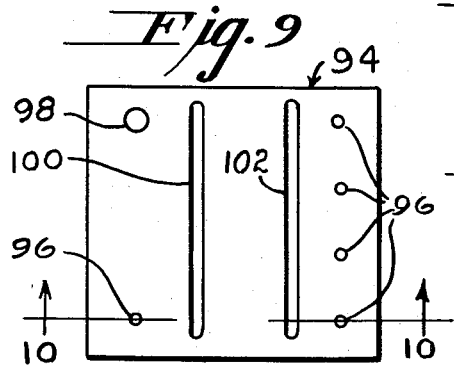
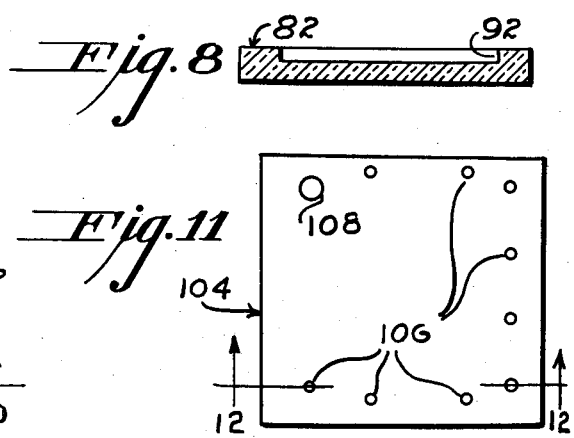
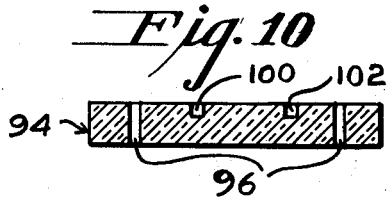
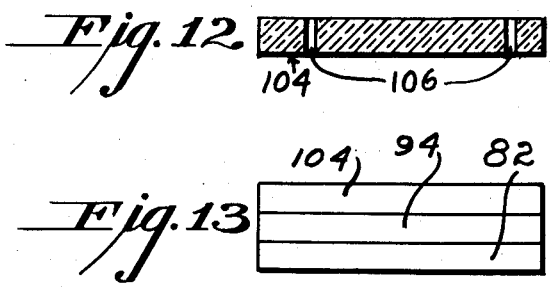

3,040,213
COMPOSITE GLACERAMIC ARTICLES AND
METHOD OF MAKING
Marshall Byer, Painted Post, Thomas G. O'Leary, Corning, and Theodore L. Reed, Big Flats, N.Y., assignors to Corning Glass Works, Corning, N.Y., a corporation of New York
Filed Nov. 15, 1956, Ser. No. 622,342
17 Claims. (Cl. 317—101)

This invention relates to composite glaceramic bodies or articles and a method of making them. The term "glaceramic," as here used, may describe either a material from which a body or article is produced or the state in which such material exists. As defined with reference to the former, it means a ceramic material that is produced initially as a glass and then converted to a material having crystalline characteristics, in particular a rigid skeleton or network of finely divided inorganic crystals, usually a minor amount of residual glass matrix, and an infinite viscosity below the liquids temperature, a temperature at which the predominant crystal phase melts and/or dissolves in residual glass with a sudden large decrease in viscosity. The conversion of a glass material to a glaceramic material may be by one of the photothermal or thermal methods in explicit detail in United States Patents No. 2,971,853 and No. 2,920,971. In sofar as pertinent the descriptive material is incorporated here by reference.

The invention has been found to be particularly useful in the fabrication of electrical components in the nature of submerged, printed circuits. Therefore such circuits and their fabrication are described herein as a specific, illustrative embodiment of the present invention.

Heretofore printed circuits generally, and particularly submerged circuits, have been mounted on panels of plastic or organic composition. In the simplest form, a circuit is applied to a plastic panel and a coat of organic insulating material painted over the circuit. In accordance with another proposed method the circuit is printed or mounted on an uncured panel of plastic, pressure is applied to embed the circuit in the plastic panel, a second plastic panel or sheet is placed over the first and the assembly heated to cure the panels and consolidate them into a unitary mass.

While such circuit assemblies have been widely used, experience has shown that their electrical characteristics tend to vary considerably under certain conditions so that it is difficult to obtain consistent performance in electrical equipment utilizing them. The constant trend toward higher power loads on such circuitry has created a demand for increasingly stringent performance standards thus accentuating the problem. A further factor has been the rapid development of new uses for complex circuitry under extreme climatic conditions of pressure, temperature and humidity where the deficiencies become most pronounced. It is our belief that these deficiencies are the result of moisture permeating the organic or plastic type materials and reducing their volume resistivity or insulating potential.

It is well known that condensation of moisture on the insulating surfaces between exposed circuit elements exerts an extremely adverse effect on surface resistivity of the insulating base material. This has seriously hampered attempts to employ glass or ceramic panels as insulating base material in the construction of printed circuit assemblies and the like. While such panels provide excellent volume resistivity, their surface resistivity may be quite erratic where moisture condensation occurs. Also low pressure conditions may induce a discharge or short between closely spaced circuit elements. Heretofore it has not been practical to produce composite or sealed glass or ceramic units such as needed for submerged circuitry. It has been difficult to consistently produce satisfactory seals between intricately grooved or shaped bodies and furthermore such bodies tend to slump or deform when heated to sealing temperatures, thereby distorting the circuitry and so altering its electrical characteristics as to render the assembly unfit for use.

The present invention makes possible the correction of these prior deficiencies by providing for the construction of a printed circuit encased or submerged in a ceramic type body wherein each element of the circuit is surrounded by a wall or layer of ceramic insulation except for its terminal portions or connections which must of necessity be exposed.

Further, the invention facilitates miniaturization of printed circuit assemblies without sacrifice of power carrying capacity and other electrical characteristics. With the advent of complex electronic equipment such as used in business machines and aircraft controls for example, it is highly desirable to develop increasingly compact circuit panels with numerous closely spaced circuit elements on a single panel. In this connection it is often desirable to increase the depth of circuit elements on a panel while decreasing the width, that is utilize two dimensions in designing circuit elements. A further purpose of the invention is to facilitate such circuit design.

In designing complex circuit assemblies, it is also convenient if not essential to utilize a plurality of stacked panels thus permitting elements to cross each other at separate levels. This construction is particularly sensitive to volume resistivity changes in the panel material and an important purpose of this invention is to facilitate construction of multi-panel circuitry.

Additionally the invention provides a convenient method of accurately forming and spacing circuit elements in a submerged printed circuit assembly.

The invention will be better understood from the following description taken in connection with the accompanying drawings in which, FIG. 1 is an exploded view of glaceramic panels employed in a simple circuit assembly in accordance with the invention and embodying a single circuit element, FIG. 2 is a sectional view in elevation of a circuit assembly produced with the panels of FIG. 1, FIGS. 3 and 5 are plan views, and FIG. 4 a sectional view in elevation taken along line 4—4 of FIG. 3, illustrating a modified form of the invention, FIG. 6 is a diagram of a hypothetical circuit arrangement designed to illustrate further application of the invention, FIGS. 7 to 12 are, alternatively, top plan and sectional elevation views of panels used in constructing the circuit of FIG. 6 and, FIG. 13 is a schematic side view showing the arrangement of the panels of FIGS. 7–12 in a completed circuit assembly.

General features of the present invention are, in the interest of simplicity, described with reference to FIGS. 1 and 2 wherein the production of a single element circuit is illustrated. As shown there, three glaceramic panels 20, 22 and 24 having substantially identical dimensions are provided with channels 26, 28, 30 which, when taken together, define a passageway corresponding to a circuit element 32. The three panels are then stacked in the indicated order and sealed by interfusion into an integral supporting body generally designated 34 with element 32 deposited in channels 26, 28 and 30 either before or after the sealing process depending on the melting temperature of the element material.

We have discovered that the surfaces of glaceramic bodies can be integrally united or interfused to produce a monolithic structure from separate preformed bodies of such material and that this interfusion process can be carried out at temperatures below the deformation temperature of the material, that is the temperature at which deforming flow takes place in a body of the material. The nature of the interfusion process which we have found to occur between such bodies is not fully understood. In some instances it appears that the interfusion occurs primarily between glassy matrices in the glaceramic bodies. In other cases, however, it seems more likely that a molecular interdiffusion between the ceramic crystals occurs at their interface. Whatever the explanation may be, our discovery provides a valuable technique for uniting bodies of this type and permits fabrication of intricate structures which are of particular value as housings for complex circuitry.

Channels 26—30 may be formed in panels 20—24 by various conventional methods such as molding or sandblasting. However, for present purposes it is highly advantageous to use photosensitive glasses of the type described in application S.N. 538,510 and to form the channels by the chemical machining process described in that application and also in United States Patent No. 2,628,160 issued February 10, 1953, to the same inventor. Briefly, the photosensitive glasses referred to may be transformed in selected areas by irradiation and subsequent heat treatment to permit selective etching of the glass. Subsequent to the selective etching process, the remaining glass is subjected to further irradiation and heat treatment to produce a glaceramic body. Reference is also made to the Stookey patent and application, referred to earlier, for further details regarding these processes.

As pointed out above, we have found that sheets or panels produced by this selective etching and crystallizing process can be sealed together by interfusion to produce an integral or monolithic body and further that such interfusion occurs at temperatures sufficiently low that appreciable deformation of the panels, or channel patterns etched therein, does not occur. These discoveries permit the formation of a glaceramic body with a honeycomb pattern of internal passageways having precise dimensions. This in turn enables us to produce intricate and complex circuit arrangements, as subsequently described, with each element completely encased within an insulating glaceramic wall and with the precise dimensions retained in the bodies and imparted to the circuitry if desired.

Referring again to FIGS. 1 and 2, glass sheets may be produced from a suitable photosensitive glass and panels of predetermined dimensions cut therefrom to provide glass panels from which panels 20—24 may be produced. These glass panels are then irradiated through suitable negatives and thereafter heated to render the treated areas comparatively susceptible to etching. The panels are then etched to provide channels 26—30, the dimensions of which may be precisely controlled through proper selection of irradiation and etching conditions including particularly the negative through which the panels are irradiated. Thereafter the channeled glass panels are converted to the glaceramic state.

Where a soft, or low melting point, conducting material is to be employed for the circuit element 32, the glaceramic panels will be vertically stacked and heated to a temperature at which interfusion occurs. Thereafter the conducting material, in a fluid state, is drawn or forced into the internal passageway formed by the etched channels and allowed to set, thus forming element 32 which will have suitable terminal members (not shown) attached. Alternatively, where a refractory metal conductor material is employed which has a melting point above the interfusion temperature of the ceramic, the circuit may be deposited within the channels prior to or in conjunction with stacking and interfusion of the panels. The circuit may be preformed as by stamping from metal sheet or may be deposited by other conventional methods such as electrolytic deposition or filling the channels with flux-bonded paste.

We have also found that it is possible to combine the thermal treatment, whereby irradiated glass bodies are converted into glaceramics, with that in which the glaceramic bodies are converted into an integral unit or structure. Thus etched glass panels, corresponding to panels 20—24, may be vertically stacked, and the assembly converted to the glaceramic state and interfused in a single heat treatment conducted for a suitable time at a sufficient temperature to perform both operations. In most instances this combined procedure will be preferred because of the practical consideration of economy. It has a further advantage in that slight surface irregularities and the like are less likely to interfere with complete interfusion of surfaces and good seals can be consistently produced at slightly lower temperatures.

By way of specific example photosensitive glass plates about one-sixteenth inch thick were produced from a glass composed basically of 79.6% $SiO_2$, 9.5% $Li_2O$, 4% $K_2O$, 4% $Al_2O_3$, 1.5% $Na_2O$ and 1% $ZnO$ and containing minor amounts of Ag, Au and $CeO_2$ as photosensitizing agents and $Sb_2O_3$ as fining agent. These plates were exposed through suitable negatives and subsequently heat treated and etched in accordance with the method taught by Stookey to produce channels and holes in the plates corresponding to a desired circuit element similar to the one pictured in FIG. 1.

The plates were then re-exposed and assembled in vertical stacked relation as illustrated in FIG. 2. The assembly was then converted to the glaceramic state by heating at a temperature of 580° C. for about 40 minutes to nucleate the glass and thereafter heating to 650° C. for 30 minutes to develop a crystalline structure. The temperature was then raised to 850° C. and maintained for one hour to completely interfuse the assembly into a monolithic glaceramic body with internal channels corresponding dimensionally to those etched in the glass plates.

Subsequently a molten solder was drawn into these channels and allowed to set to form a circuit element submerged and sealed in glaceramic.

In an alternative procedure similar photosensitive glass plates exposed to irradiation were preferentially etched to produce a desired channel pattern and then re-exposed and heat treated under the conditions recited above to produce individual glaceramic plates. These plates were then assembled and heated for one hour at 850° C. and cooled. The result was, as previously, a substantially monolithic body. The use of somewhat higher temperatures and/or pressure on the assembly will improve the latter type seal but care must be taken to avoid distortion.

In some instances it may be more convenient to employ a single panel in place of panels 22 and 24. Under such circumstances circuit channel 28 will be etched into one surface of the panel to a desired depth and will extend only part way through the panel. Suitably extended treatment of that portion of the glass to be removed for perforation 30 would, of course, be necessary. This alternative construction is particularly suitable in producing a circuit arrangement where connections are made through only the top surface or through ends and sides of the assembly.

FIGS. 3–5 illustrate circuit components used in assembling a rotary connector for multiple circuits, a type of assembly in which the present invention finds particular value. Panel 40 is provided with a perforation 42 which may be molded in or etched through the panel. This is intended for mounting of a rotary contact member (not shown). Panel 40 is further provided with a plurality of closely spaced, small channels 44 etched into one surface as shown in FIG. 4. The multitude of circuit elements 46 intended for insertion in channels 44 may be conveniently formed in a single metal stamping 48 having a connecting strip 50 for convenience in handling. In assembling this unit, stamping 48 is positioned in channels 44 and a panel (not shown) corresponding to panel 40, but without any channels etched therein, superimposed on panel 40 and fused thereto. Subsequent to fusion, connecting strip 50 may be severed along the dotted line shown in FIG. 5 thus providing separate circuit elements with terminals extending outwardly from the end of the supporting structure formed by fusing of the glaceramic panels.

The present invention is also highly advantageous in the construction of multiple element circuitry involving cross-overs. FIGS. 6-13 illustrate the construction and assembly of such circuitry in accordance with the present invention. In FIG. 6 a hypothetical circuit is shown which includes a central or rotary contact 60, circuit branches 62, 64, 66 extending from contact 60 to separate terminal points generally designated 68, a separate circuit branch 70 extending between terminals 72—72, and two circuit branches 74 and 76 extending between terminals 78—78 and 80—80 respectively and each crossing over branches 62, 64, 66 and 70.

In constructing such circuitry, one group of parallel elements is deposited or mounted on panel 82 of FIGS. 7 and 8, while a second group, which cross over the first group, is printed on a separate panel 94 as shown in FIGS. 9 and 10. A third panel 86, shown in FIGS. 11 and 12, serves as a cover panel and the three panels are stacked and interfused as shown in FIG. 13.

Panel 82 is intended to be the base or bottom panel in the ultimate assembly. It has a depression 84 formed in its upper surface to receive a central terminal member (not shown). If desired this may be a complete perforation of panel 82. Channels 86, 88, 90 and 92 are formed in the panel surface, as by partially etching through a suitably treated glass body, as indicated in FIG. 8. These channels are then provided with conducting material to form circuit elements corresponding respectively to branches 62—66 and 70 of the diagram in FIG. 6.

Panel 94 corresponds dimensionally to panel 82 and forms the central panel of the assembly. It has perforations 96 formed in it to permit mounting of terminals for the circuit elements corresponding to branches 62—66 and 70 which are formed in the channels of panel 82. It also has a larger perforation 98 for the contact member corresponding to contact 60 in the diagram. In addition to these perforations panel 94 has formed in its upper surface channels 100 and 102 which are designed to be filled with conducting material or otherwise support circuit elements corresponding to branches 74 and 76 on the circuit diagram.

Panel 104 is a cover panel which has no circuitry mounted on it, but has perforations 106 so located as to provide for terminals to each of the circuit elements mounted on panels 82 and 94. It also has a larger perforation 108 for the central contact member. It will be noted that by using shallow channels in panel 94, the remainder of the panel separates and insulates the circuit elements on the two panels 82 and 94 when the panels are properly stacked with the etched or channeled surface constituting the upper surface in each instance. Thus the problem of cross-overs is simply and effectively solved with each circuit element being provided with a glaceramic insulating wall when the panels are stacked and fused together as shown in FIG. 13.

It will be appreciated that a greater number of panels may be employed if desired for more complex circuits and the number of panels required, and arrangement of elements on each panel, is a matter of circuit design. The diagram of FIG. 6 is a relatively simple one devised for illustrative purposes only.

While the invention has been described in terms of a specific product embodiment, namely submerged circuitry, and is of particular utility for the making of such articles, it will be appreciated that it is not restricted to such use but rather extends to the production of any composite structure from preformed glaceramic bodies or glass bodies capable of being converted to glaceramic bodies. For example passages so formed may be used to conduct the flow of fluids or transmit fluid pressure to predetermined points.

What is claimed is:

1. A method of forming a composite glaceramic body which includes interfusing, at a temperature below the deformation temperature of the glaceramic, the meeting surfaces of at least two preformed glaceramic bodies arranged in juxtaposed relation.

2. A method of forming a composite glaceramic body which includes the steps of converting a plurality of separately preformed glass bodies into the glaceramic state and, while such bodies are arranged in juxtaposed relation, interfusing their meeting surfaces at a temperature below the deformation temperature of the glaceramic.

3. The method of claim 2 in which the separate bodies are converted to the glaceramic state and interfused together in a single heat treatment.

4. A method of forming a composite glaceramic body which comprises preforming a plurality of separate glaceramic bodies, arranging them in juxtaposed relation, and heating the assembly to a temperature at which the meeting surfaces of the separate bodies become interfused to form a single integral body, such interfusion temperature being below the deformation temperature of the glaceramic.

5. A method of forming a glaceramic body having internal voids or spaces which comprises preforming a plurality of separate bodies with at least one of such bodies having depressed configurations in its surface, arranging the bodies in juxtaposed relation with the configured surface adjacent a surface of a second body and heating the assembly to a temperature at which the meeting surfaces of the separate bodies become interfused to form a single integral body, such interfusion temperature being below the deformation temperature of the glaceramic.

6. A method of making an encased printed circuit which includes the steps of forming, within at least one of a plurality of panels, a pattern of channels into which conducting material can be deposited to form the desired circuit, assembling the panels in such manner that the channels constitute passageways within the assembly, and interfusing the assembly into an integral, glaceramic body, such interfusion temperature being below the deformation temperature of the glaceramic.

7. The method of claim 6 in which the pattern of channels is formed in a glass base panel, a conducting material is deposited in the channels to form circuit elements and a glass cover panel is arranged over the channeled surface of the glass base to form the assembly to be converted into an integral glaceramic body.

8. The method of claim 7 in which the circuit is preformed from a refractory metal.

9. The method of claim 6 in which, after an integral glaceramic body is formed, conducting material is drawn into the passageways in fluid form and solidified therein to form the desired circuit.

10. The method of claim 6 in which the channels are formed in glaceramic panels and these panels are converted into an integral body by interfusing their meeting faces.

11. A composite glaceramic body composed of a plurality of preformed glaceramic bodies arranged to provide meeting surfaces and interfused together at such meeting surfaces, at a temperature below the deformation temperature of the glaceramic, to produce an integral structure.

12. A glaceramic body composed of a plurality of preformed bodies arranged in a predetermined juxtaposed order with at least a portion of the meeting surfaces of said bodies having configurations formed therein and with the meeting surfaces being interfused to form a single integral body having internal spaces corresponding in shape and design to said preformed configurations.

13. A printed circuit assembly comprising an electrically conducting circuit element and a composite glaceramic support body surrounding and encasing the element except for terminal portions of said element.

14. A printed circuit assembly comprising a glaceramic body provided with a plurality of preformed internal passageways and conducting material supported within said passageways to form encased elements of a printed circuit.

15. A printed circuit assembly comprising a glaceramic, insulating base having channels in one surface which correspond in form to elements of an electrically conducting circuit, conductive circuit elements supported by said base in said channels, and a glaceramic cover integrally united with the base, at a temperature below the deformation temperature of the glaceramic to form a supporting structure which encases the circuit elements except for terminal connections and provides glaceramic insulating walls intermediate adjacent circuit elements.

16. A printed circuit assembly comprising a plurality of glaceramic panels arranged and integrally united in stacked relationship at a temperature below the deformation temperature of the glaceramic, at least one of said panels having been provided with preformed channels to provide internal passageways in the structure, and electrically conducting material supported within said passageways and forming elements of a printed circuit having terminal connections at the ends of said passageways.

17. An assembly in accordance with claim 16 which comprises at least two panels provided with preformed channels and has its constituent panels so stacked that each channeled panel surface constitutes the upper surface of a panel in the assembly and is covered by an unchanneled panel surface to create internal passageways, and has circuit elements within said passageways at two separate levels in the assembly so that at least a part of the passageways and circuit elements at one level cross over at least a part of those at the second level and are separated therefrom by a glaceramic wall.

References Cited in the file of this patent

UNITED STATES PATENTS

| | | |
|---|---|---|
| 761,204 | Carpenter | May 31, 1904 |
| 1,718,993 | Wermine | July 2, 1929 |
| 2,504,504 | Despois | Apr. 18, 1950 |
| 2,515,937 | Stookey | July 18, 1950 |
| 2,547,022 | Leno | Apr. 3, 1951 |
| 2,620,598 | Purser | Dec. 9, 1952 |
| 2,677,920 | Danzin | May 11, 1954 |
| 2,749,668 | Chaffotte | June 12, 1956 |
| 2,825,634 | Rindone | Mar. 4, 1958 |
| 2,913,632 | Stanton | Nov. 17, 1959 |

FOREIGN PATENTS

| | | |
|---|---|---|
| 953,590 | France | Dec. 8, 1949 |
| 688,461 | Great Britain | Mar. 11, 1953 |